United States Patent
Shi (10) Patent No.: US 10,598,984 B2
(45) Date of Patent: Mar. 24, 2020

(54) REFLECTIVITY ADJUSTABLE WALL UNIT, WALL MODULE AND INTELLIGENT BUILDING EXTERIOR WALL SYSTEM

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventor: Bo Shi, Beijing (CN)

(73) Assignees: BOE TECHNOLGOY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 0 days.

(21) Appl. No.: 16/140,047

(22) Filed: Sep. 24, 2018

(65) Prior Publication Data
US 2019/0302525 A1    Oct. 3, 2019

(30) Foreign Application Priority Data
Mar. 27, 2018 (CN) .......................... 2018 1 0256065

(51) Int. Cl.
*G02F 1/133* (2006.01)
*G02F 1/1335* (2006.01)
(Continued)

(52) U.S. Cl.
CPC ..... *G02F 1/133555* (2013.01); *G02B 5/0883* (2013.01); *G02F 1/1343* (2013.01); *G02F 1/157* (2013.01)

(58) Field of Classification Search
None
See application file for complete search history.

(56) References Cited

U.S. PATENT DOCUMENTS

2006/0007550 A1*   1/2006   Tonar ...................... B60R 1/088
                                                              359/604
2013/0141659 A1    6/2013   Xue et al.
(Continued)

FOREIGN PATENT DOCUMENTS

| CN | 1920199 A | 2/2007 |
| CN | 102629048 A | 8/2012 |
| CN | 106740498 A | 5/2017 |

OTHER PUBLICATIONS

Second Chinese Office Action dated Dec. 31, 2019, received for corresponding Chinese Application No. 201810256065.0, 27 pages.

*Primary Examiner* — James A Dudek
(74) *Attorney, Agent, or Firm* — Kinney & Lange, P.A.

(57) ABSTRACT

A reflectivity adjustable wall unit includes a transflective layer, a reflective layer, a first sealing gap defined between the transflective layer and the reflective layer, and a liquid crystal layer in the first sealing gap. The transflective layer is used as an outer layer of the reflectivity adjustable wall unit, and reflects some of ambient light irradiated at the transflective layer while allowing some of the ambient light to pass through. The reflective layer is disposed opposite to the transflective layer. The reflective layer includes an electrochromic reflective layer, a liquid crystal electrode layer and a base substrate, and the electrochromic reflective layer, the liquid crystal electrode layer and the base substrate are sequentially arranged from an outside to an inside. The electrochromic reflective layer has variable reflectivity under control of an external control voltage; and the liquid crystal layer has variable index under control of the liquid crystal electrode layer.

15 Claims, 5 Drawing Sheets (51) Int. Cl.
*G02B 5/08* (2006.01)
*G02F 1/1343* (2006.01)
*G02F 1/157* (2006.01)

(56) References Cited

U.S. PATENT DOCUMENTS

| | | | | |
|---|---|---|---|---|
| 2014/0340729 A1* | 11/2014 | Tajima | ................... | G02F 1/1523 |
| | | | | 359/266 |
| 2015/0362728 A1* | 12/2015 | Tei | ....................... | G02B 5/3033 |
| | | | | 353/20 |
| 2016/0209652 A1* | 7/2016 | Ichihashi | ................. | G02B 5/26 |
| 2017/0235165 A1* | 8/2017 | Yamada | .............. | G02F 1/13439 |
| | | | | 349/33 |
| 2018/0229659 A1 | 8/2018 | Shi et al. | | |

* cited by examiner

REFLECTIVITY ADJUSTABLE WALL UNIT, WALL MODULE AND INTELLIGENT BUILDING EXTERIOR WALL SYSTEM

CROSS-REFERENCE TO RELATED APPLICATION

This application claims priority to Chinese Patent Application No. 201810256065.0, filed on Mar. 27, 2018, which is herein incorporated by reference in its entirety.

BACKGROUND

The present disclosure relates to field of building exterior walls and optical devices, and in particular to a reflectivity adjustable wall unit, a wall module, and an intelligent building exterior wall system.

Currently, facades of many high-rise buildings are decorated with glass. For aesthetic reasons, many glass facades are constructed with mirror materials of high reflectivity. In this way, under the scorching sun, strong light reflected by shining glass walls will have a serious impact on pedestrians and drivers outside the buildings. Dazzling reflection not only damages visual organs, but also brings inconvenience to traffic and impairs driving safety. The dazzling reflection from taller skyscrapers may even affect aircraft flight safety. White light pollution has become a new unnatural urban hazard.

Recently, electrochromic glass has been used as an external wall in intelligent buildings. The electrochromic smart glass can adjust its light absorption and light transmission under action of an electric field, and can selectively absorb or reflect external thermal radiation and internal heat diffusion, thereby reducing the amount of energy that office buildings and residential homes consume during the summer and during the winter. However, according to ordinary usage habits, sunlight is stronger in the summer and people indoors prefer to reduce incidence of hot light from outside. The electrochromic glass is consequently adjusted to increase reflection and reduce incidence, so as to bring down indoor temperatures. However, for ambient environment outside the wall, increased reflection off of buildings in strong summer glare can result in serious light pollution. Meanwhile, light absorbed by the electrochromic glass will also be converted into heat. This heat is eventually transmitted into the building, where it burdens building air conditioning systems.

SUMMARY

According to a first aspect, one embodiment of the present disclosure provides a reflectivity adjustable wall unit, which includes a transflective layer, a reflective layer, a first sealing gap defined between the transflective layer and the reflective layer, and a liquid crystal layer in the first sealing gap. The transflective layer is used as an outer layer of the reflectivity adjustable wall unit, reflects some of ambient light irradiated at the transflective layer and allows some of the ambient light to pass through. The reflective layer is disposed opposite to the transflective layer. The reflective layer includes an electrochromic reflective layer, a liquid crystal electrode layer and a base substrate, and the electrochromic reflective layer, the liquid crystal electrode layer and the base substrate are sequentially arranged from an outside to an inside. The electrochromic reflective layer has variable reflectivity under control of an external control voltage; and the liquid crystal layer has variable index under control of the liquid crystal electrode layer.

In some embodiments, the electrochromic reflective layer employs electro-reflection mechanism based on silver ion gel electrolyte deposition; the electrochromic reflective layer includes: a smooth transparent electrode layer with a smooth electrode surface for deposition of silver ions for forming mirror reflection; a rough electrode layer with a rough electrode surface for deposition of silver ions for forming low reflection; a second sealing gap defined between the smooth transparent electrode layer and the rough electrode layer; and silver ion gel electrolyte in the second sealing gap.

In some embodiments, the electrochromic reflective layer employs hydrogen ion implantation type electrochromic reflective material based on Mg—Ni alloy.

In some embodiments, the refractive index of the liquid crystal layer is adjustable in a range of from 1.4 to 1.6.

In some embodiments, the transflective layer is made of material that has a reflectivity in a range of from 40% to 70%, a transmittance in a range of from 30% to 60%, and a refractive index in a range of from 1 to 1.7.

In some embodiments, the transflective layer includes a glass substrate and a brightening film; and the brightening film is attached to the glass substrate with a mirror surface of the brightening film oriented outside.

In some embodiments, the transflective layer and the reflective layer are sealed together by a sealing device with the first sealing gap defined between the transflective layer and the reflective layer.

In some embodiments, the smooth transparent electrode layer and the rough electrode layer are sealed by a sealing device with the second sealing gap defined between the smooth transparent electrode layer and the rough electrode layer.

According to a second aspect, one embodiment of the present disclosure provides a reflectivity adjustable wall module which includes: the above reflectivity adjustable wall unit; a light sensing unit configured to measure light incident to the reflectivity adjustable wall unit; and a component control unit communicated with the light sensing unit and electrically connected with the reflectivity adjustable wall unit. The component control unit is configured to, according to lighting data obtained by the light sensing unit via measurement, control the reflectivity of the electrochromic reflective layer and the refractive index of the liquid crystal layer in the reflectivity adjustable wall unit.

In some embodiments, the light sensing unit is configured to measure light intensity of incident light to the reflectivity adjustable wall unit; the component control unit is configured to, according to the light intensity of the incident light obtained by the light sensing unit via measurement, control the electrochromic reflective layer to enter into a mirror reflection state when the light intensity is greater than a specified threshold, and control the refractive index of the liquid crystal layer, thereby enabling a first reflection component and a second reflection component of the incident light to cancel each other out in a predetermined ratio; the first reflection component refers to one part of the incident light, that is directly reflected at an outer surface of the transflective layer; the second reflection component refers to another part of the incident light, that is refracted by the transflective layer and the liquid crystal layer and then reflected by the reflective layer, then refracted by the transflective layer and the liquid crystal layer again and emits from the transflective layer.

In some embodiments, the predetermined ratio according to which the first reflection component and the second reflection component cancel each other out, are set to be that the stronger the light intensity of the incident light is, the greater the predetermined ratio according to which the first reflection component and the second reflection component cancel each other out.

In some embodiments, the refractive index of the liquid crystal layer satisfies $n2=(\lambda/2+m\lambda)/(2d)$, where $\lambda$ represents wavelength of light, m is an integer, d represents a width of the first sealing gap between the transflective layer and the reflective layer, a maximum destructive interference is achieved between the first reflection component corresponding to the wavelength k and the second reflection component corresponding to the wavelength $\lambda$; the stronger the light intensity of the incident light is, a value of the refractive index of the liquid crystal layer is controlled to be closer to $(\lambda/2+m\lambda)/(2d)$.

In some embodiments, the light sensing unit is further configured to measure wavelength and the light intensity of the incident light to the reflectivity adjustable wall unit; the component control unit is configured to, according to the light intensity of the incident light obtained by the light sensing unit via measurement, control the electrochromic reflective layer to enter into a mirror reflection state when the light intensity is greater than a specified threshold; according to the wavelength of the incident light, control the refractive index of the liquid crystal layer, thereby enabling the first reflection component and the second reflection component of the incident light to cancel each other out in a predetermined ratio.

In some embodiments, there is a plurality of reflectivity adjustable wall units that are adjacent each other.

According to a third aspect, one embodiment of the present disclosure provides an intelligent building exterior wall system which includes a plurality of reflectivity adjustable wall modules. Each reflectivity adjustable wall module includes: the above reflectivity adjustable wall unit; a light sensing unit configured to measure light incident to the reflectivity adjustable wall unit; and a component control unit communicated with the light sensing unit and electrically connected with the reflectivity adjustable wall unit. The component control unit is configured to, according to lighting data obtained by the light sensing unit via measurement, control the reflectivity of the electrochromic reflective layer and the refractive index of the liquid crystal layer in the reflectivity adjustable wall unit.

In some embodiments, the intelligent building exterior wall system further includes a central control unit; wherein the central control unit is communicated with each component control unit and controls each component control unit to work.

In some embodiments, there is a plurality of reflectivity adjustable wall units in each reflectivity adjustable wall module, and the reflectivity adjustable wall units are adjacent each other.

BRIEF DESCRIPTION OF THE DRAWINGS

A brief introduction will be given hereinafter to the accompanying drawings which will be used in the description of the embodiments in order to explain the embodiments of the present disclosure more clearly. The drawings and description below are merely for illustrating some embodiments of the present disclosure. Those skilled in the art may obtain other drawings according to these drawings without any creative labor.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise indicated. The following description of exemplary embodiments is merely used to illustrate the present disclosure and is not to be construed as limiting the present disclosure.

Currently, when using the electrochromic glass in exterior walls, the interests of the users indoors and ambient environment as well as the public interest are contradictory, since strong light does not enter the room, it must be reflected to the outside; when light is absorbed, the light is converted into heat which is finally transmitted to the building, and the heat will finally become burden of an air conditioning system. This is an either/or zero-sum solution that cannot be environmentally friendly. In view of this, inventors creatively propose a win-win solution based on the volatility of light, which reduces dazzling reflections on the exterior walls of the building while being conducive to regulation of light and heat inside the building according to the principle of light cancellation.

Embodiments of the present disclosure will be described in details hereinafter in conjunction with the drawings.

According to a first aspect of the present disclosure, one embodiment of the present disclosure provides a reflectivity adjustable wall unit, which may be used as a basic building material unit for building external wall materials. Each reflectivity adjustable wall unit may be in form of a flat plate. Particularly, each reflectivity adjustable wall unit may be of a regular geometric shape, such as square, rectangle, diamond, triangle or regular hexagon. Of course, each reflectivity adjustable wall unit may be manufactured or cut into other shapes according to needs.

Figure 1:
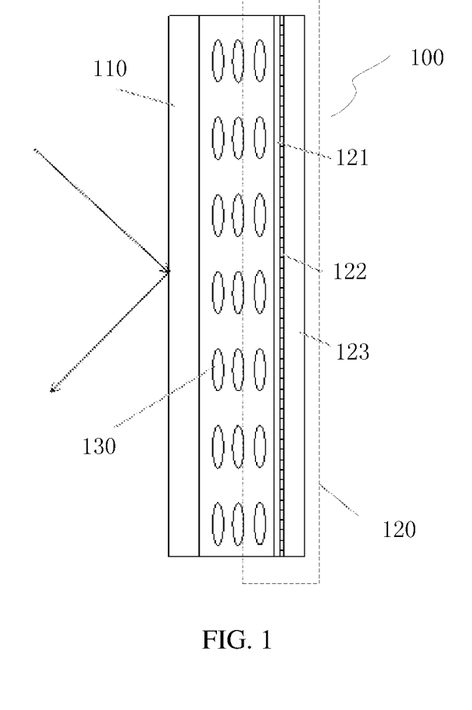
FIG. 1 is a sectional view of a reflectivity adjustable wall unit according to an embodiment of the present disclosure.
Figure 2:
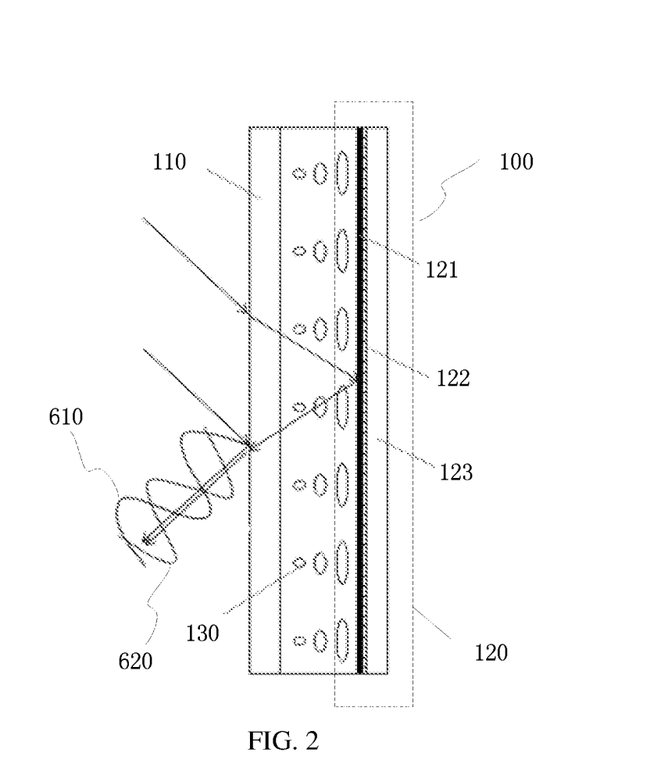
FIG. 2 is a schematic diagram showing working principle of the reflectivity adjustable wall unit according to an embodiment of the present disclosure.

Structures of the reflectivity adjustable wall unit are shown in FIG. 1. FIG. 1 is a sectional view of a reflectivity adjustable wall unit according to an embodiment of the present disclosure. The reflectivity adjustable wall unit 100 includes a transflective layer 110, a reflective layer 120 and a liquid crystal layer 130. The working principle of the reflectivity adjustable wall unit is shown in FIG. 2. As shown in FIG. 2, when an incident light is irradiated at an outer surface of the transflective layer, one part of the incident light, that is directly reflected at the outer surface of the transflective layer, forms a first reflection component 610. Another part of the incident light, is first refracted by the transflective layer and the liquid crystal layer and then reflected by the reflective layer 120, then refracted by the transflective layer and the liquid crystal layer again and emits from the transflective layer to form a second reflection component 620. A phase difference between the first reflection component 610 and the second reflection component 620 may be controlled by adjusting refractive indexes of the liquid crystal layer. When the phase difference between the first reflection component and the second reflection component is an integer multiple of $\pi/2$, the maximum destructive interference may be achieved, thereby greatly reducing overall reflectivity. According to a degree of approximation of the phase difference to an integral multiple of $\pi/2$, different degrees of destructive interference may be controlled, thereby achieving adjustable overall reflectivity of the reflectivity adjustable wall unit.

The transflective layer 110 may be used as an outer layer of the reflectivity adjustable wall unit. In the present disclosure, for convenience of description, the term "outer" refers to a direction oriented towards outdoors when the reflectivity adjustable wall unit is used for building exterior walls for anti-glare; the term "inner" refers to a direction oriented towards indoors when the reflectivity adjustable wall unit is used for building exterior walls for anti-glare. It should be noted that, the terms "outer" and "inner" are merely used to conveniently illustrate relative orientations of each other when describing various levels of the wall unit, and are not used to limit implementation of the wall unit. When the wall unit is used for a variety of purposes, the inner and outer directions are not fixed and may be adjusted flexibly according to different light reflection requirements.

The transflective layer 110 may be made of transparent material with reflection and refraction properties. Thus, when ambient light is irradiated at the transflective layer 110, some of light is reflected at the surface of the transflective layer, and some of light is refracted at the surface of the transflective layer and enters an inside of the wall unit by passing through the transflective layer. In order to achieve better anti-glare effect, in some embodiments, the transflective layer 110 may be made of material that has a reflectivity a in a range from 40% to 70%, a transmittance b in a range from 30% to 60%, and a refractive index n1 in a range from 1 to 1.7. Apparently, the refractive index n1 is greater than the refractive index n0 (n0=1) of air. Transparent materials satisfying the above conditions may be used in the present disclosure, and different materials may be selected according to costs and desired adjustment ranges of reflectivity of the wall.

When considering from aesthetics and durability, the transflective layer may be in form of a semi-transmitting glass that allows a part of incident light to pass through while reflecting another part of the incident light. Generally speaking, in one embodiment for achieving anti-glare of the buildings, an average transmittance of the ordinary glass is slightly higher than 80%, and the ordinary glass may not be directly used as material for the transflective layer. Thus, special purpose glass with higher reflectivity is required. In one embodiment, an ordinary glass substrate provided with a brightening film may be used as the transflective layer, and achieves above desired ranges of reflectivity and transmittance. When the brightening film is attached to the glass substrate with a mirror surface of the brightening film oriented outside, the reflectivity of the glass substrate is increased while the transmittance of the glass substrate is reduced. In order to obtain ideal anti-glare effect, in one embodiment, the transflective layer 110 may include an APF brightening film. The APF brightening film is a mature commercial product on the market, for example, the APF brightening film manufactured by the 3M company may be applied to the transflective layer of the present disclosure.

Figure 3:
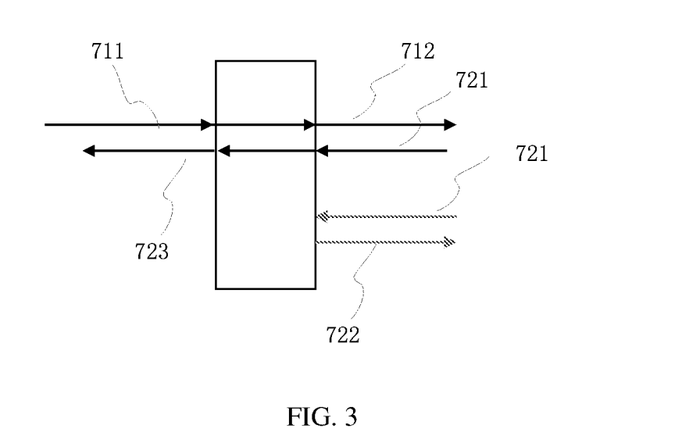
FIG. 3 is a schematic diagram showing paths of light arriving at the a transflective layer according to an embodiment of the present disclosure.

FIG. 3 is a schematic diagram showing paths of light arriving at the transflective layer. Most of an incident light 711 from one side of the transflective layer passes through the transflective layer 110 and emits from another side of the transflective layer to form an emitted light 712. Some of an incident light 721 from the another side of the transflective layer passes through the transflective layer 110 and emits from the one side of the transflective layer to form an emitted light 723. Most of the incident light 721 from the another side of the transflective layer are reflected at an incident surface, thereby forming a reflected light 722. The ratio of the transmitted light and the reflected light satisfies above ranges of the reflectivity a and the transmittance b. when used for anti-glare purpose, a mirror surface of the transflective layer, that reflects more light, is oriented outside.

The reflective layer 120 is used as the innermost layer of the wall unit, and is used to reflect light irradiating at the reflective layer 120 in a controlled manner. Meanwhile, a control electrode for the liquid crystal layer is also disposed at the reflective layer 120. Referring to FIG. 1, the reflective layer 120 includes an electrochromic reflective layer 121, a liquid crystal electrode layer 122 and a base substrate 123. The electrochromic reflective layer 121, the liquid crystal electrode layer 122 and the base substrate 123 are sequentially arranged from the outside to the inside.

The electrochromic reflective layer 121 has variable reflectivity under control of an external control voltage. The electrochromic reflective layer 121 may be implemented in a variety of ways. For example, the electrochromic reflective layer 121 may adopt the typically hydrogen ion implantation type electrochromic reflective material based on Mg—Ni alloy. For another example, the electrochromic reflective layer may use electronic control mode to drive silver ions in gel electrolyte to deposit on a smooth surface to obtain mirror reflection.

The hydrogen ion or lithium ion implantation type electrochromic reflective material based on transition metal oxide and the metal electrodeposited electrochromic material usually switch between two states including a light transmitting state and a colored state. Although the hydrogen ion implantation type electrochromic reflective material based on Mg—Ni alloy can achieve mirror reflection, it has a low reflectivity, needs to produce hydrogen by electrolyzing water or requires catalytic realization of precious metal Pd, thus it has a high cost. By using uniform deposition of silver ions on a smooth plane to form a mirror surface and using intense non-uniform deposition of silver ions on a non-smooth surface to form a black, almost opaque state by means of light scattering, the prepared electrochromic reflective layer has mirror reflection, light transmission and black opacity, and is an optimal scheme for the electrochromic reflective layer of the present disclosure. The transparent electrode may be made of indium tin oxide (ITO) or zinc oxide aluminum transparent conductive glass.

Figure 4:
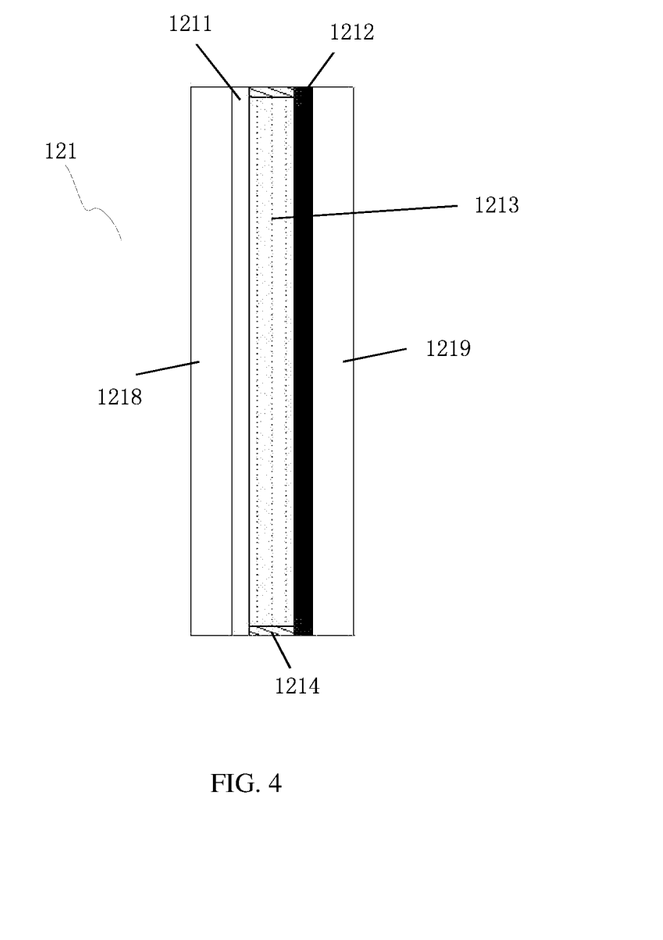
FIG. 4 is a sectional view of an electrochromic reflective layer according to an embodiment of the present disclosure.

FIG. 4 is a sectional view of the electrochromic reflective layer according to an embodiment of the present disclosure. The electrochromic reflective layer 121 includes a smooth transparent electrode layer 1211, a rough electrode layer 1212 and silver ion gel electrolyte 1213 disposed between the smooth transparent electrode layer 1211, and the rough electrode layer 1212. In order to protect the electrode layers, a transparent base substrate 1218 is disposed at an outer side of the smooth transparent electrode layer 1211 and a transparent base substrate 1219 is disposed at an outer side of the rough electrode layer 1212. In manufacturing process, substrates each coated with one electrode layer are first prepared; a space between the smooth transparent electrode layer 1211 and the rough electrode layer 1212 is sealed with a sealing device (i.e., sealant) 1214, thereby forming a second sealing gap. The silver ion gel electrolyte 1213 is disposed within the second sealing gap.

The smooth transparent electrode layer 1211 has a smooth electrode surface for deposition of silver ions. The so-called smooth electrode surface means that smoothness of the smooth electrode surface can satisfy that when the smooth transparent electrode layer is energized, silver ions are deposited on the smooth electrode surface to form mirror reflection. In some embodiments of the present disclosure, a reflectivity C of mirror reflection is greater than 60%. The rough electrode layer 1212 has a rough electrode surface for deposition of silver ions. The so-called rough electrode surface means that roughness of the rough electrode surface can satisfy that when the rough electrode layer is energized, silver ions are deposited on the smooth electrode surface to have extremely low reflection or form a black effect with almost no reflection. The electrochromic reflective layer has no reflection effect in power off state, with silver ions suspended in the gel electrolyte, and is in a diffuse reflection state.

The liquid crystal layer 130 is disposed between the transflective layer 110 and the reflective layer 120. Structures and manufacturing method of the liquid crystal layer 130 are similar to those of liquid crystal panels. The transflective layer 110 and the reflective layer 120 are sealed together with a sealing device with a first sealing gap defined therebetween. The first sealing gap is of a specified width of d. The liquid crystal layer 130 is filled in the first sealing gap. A refractive index of the liquid crystal layer 130 is adjustable under control of the liquid crystal electrode layer 122. For example, an ITO electrode may be disposed at the electrochromic reflective layer 121 to form the liquid crystal electrode layer that is used to control deflection of liquid crystal. In some embodiments, the refractive index n2 of the liquid crystal layer 130 is adjustable between 1.4 and 1.6 under control of an electric field.

In application, working states of the liquid crystal layer 130 and the electrochromic reflective layer 121 are controlled according to light conditions in conjunction with corresponding control strategies.

Figure 5:
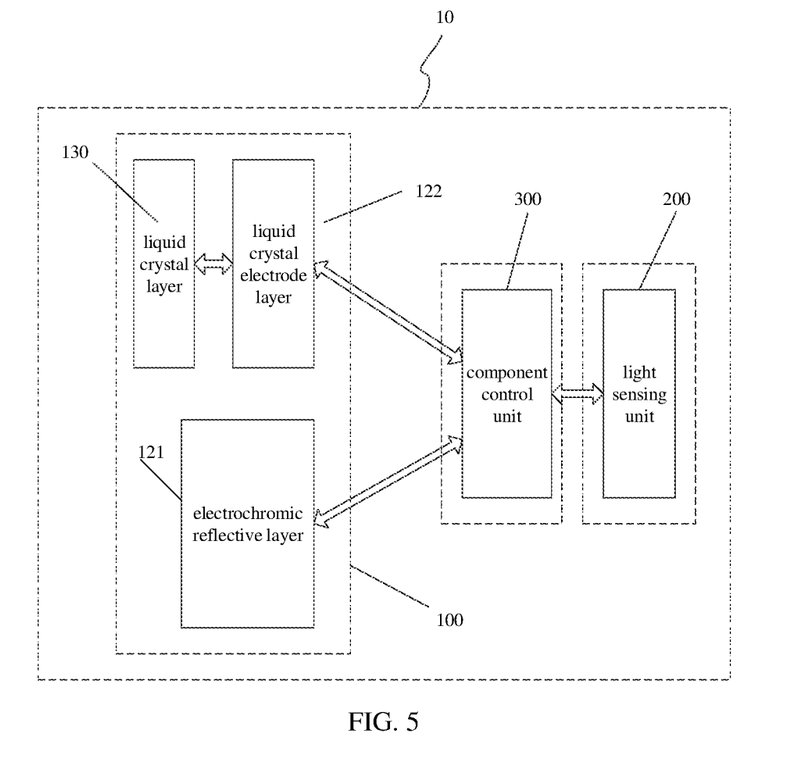
FIG. 5 is a block diagram of a reflectivity adjustable wall module according to an embodiment of the present disclosure.

According to a second aspect of the present disclosure, one embodiment of the present disclosure provides a reflectivity adjustable wall module. FIG. 5 is a block diagram of a reflectivity adjustable wall module according to an embodiment of the present disclosure. As shown in FIG. 5, the reflectivity adjustable wall module 10 includes a reflectivity adjustable wall unit 100, a light sensing unit 200 and a component control unit 300.

The reflectivity adjustable wall unit 100 may be the reflectivity adjustable wall unit of any one of above embodiments according to the first aspect of the present disclosure.

The light sensing unit 200 is used to measure light incident to the reflectivity adjustable wall unit. Generally speaking, for the purpose of anti-glare, the light sensing unit 200 only needs to measure an intensity of incident light, that is, the light sensing unit 200 may be implemented as a light intensity sensor. For application scenarios, the light sensing unit 200 may further include a sensor for measuring wavelength and frequency of light.

The component control unit 300 is communicated with the light sensing unit 200, and is electrically connected with the reflectivity adjustable wall unit 100. The component control unit 300 is used to, according to lighting data obtained by the light sensing unit 200 via measurement, control the reflectivity of the electrochromic reflective layer 121 and the refractive index of the liquid crystal layer 130 in the reflectivity adjustable wall unit 100. For applications for anti-glare, controlling of the reflectivity of the electrochromic reflective layer 121 mainly includes energizing the smooth electrode to enable the electrochromic reflective layer 121 to be in a mirror reflection state; and controlling of the refractive index of the liquid crystal layer 130 is achieved mainly by the liquid crystal electrode layer 122.

Figure 6:
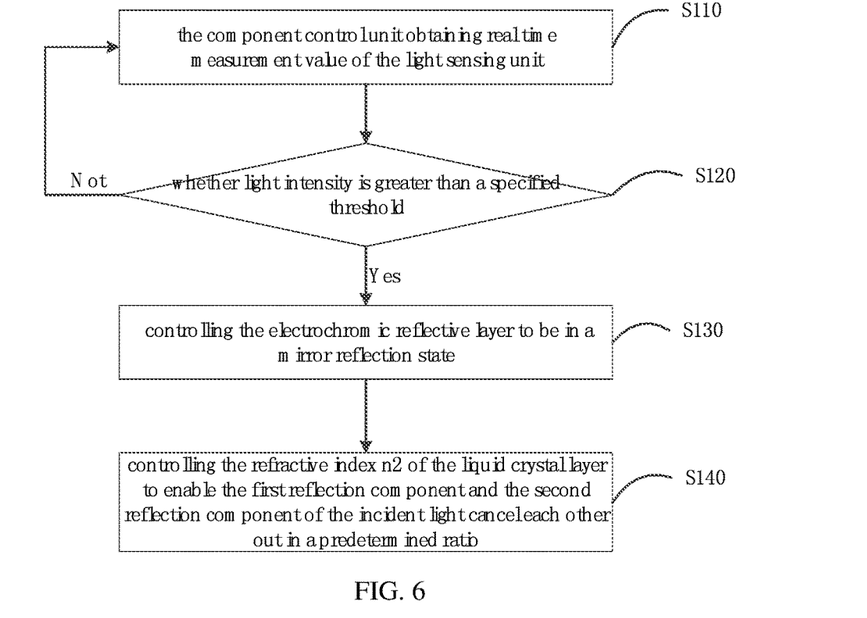
FIG. 6 shows a workflow diagram of the reflectivity adjustable wall module according to an embodiment of the present disclosure.

FIG. 6 shows a workflow diagram of the reflectivity adjustable wall module when the reflectivity adjustable wall module is used for anti-glare. As shown in FIG. 6, the workflow includes the following steps.

At step S110, the component control unit obtains real time measurement value of the light sensing unit.

At step S120, the component control unit determines whether current light intensity is greater than a specified threshold; if the current light intensity is not greater than the specified threshold, returning to the step S110 to continue to monitor real time light intensity; if the current light intensity is greater than the specified threshold, performing the step S130.

At step S130, the component control unit controls the electrochromic reflective layer to be in a mirror reflection state.

At step S140, the component control unit controls the refractive index n2 of the liquid crystal layer to enable the first reflection component and the second reflection component of the incident light cancel each other out in a predetermined ratio. The first reflection component refers to one part of the incident light, that is directly reflected at the outer surface of the transflective layer. The second reflection component refers to another part of the incident light, that is first refracted by the transflective layer and the liquid crystal layer and then reflected by the reflective layer, then refracted by the transflective layer and the liquid crystal layer again and emits from the transflective layer.

Generally, the predetermined ratio according to which the first reflection component and the second reflection component cancel each other out, may be set to be that the stronger the light intensity of the incident light is, the greater the predetermined ratio according to which the first reflection component and the second reflection component cancel each other out.

For the reflectivity adjustable wall module of the present disclosure, when the refractive index n2 of the liquid crystal layer is an ideal value that satisfies $n2=(\lambda/2+m\lambda)/(2d)$, where $\lambda$ represents wavelength of light, d represent the width of the first sealing gap between the transflective layer and the reflective layer, crests/troughs of the first reflection component corresponding to the wavelength $\lambda$ overlap with troughs/crests of the second reflection component corresponding to the wavelength $\lambda$, thereby achieving the maximum destructive interference.

The stronger the light intensity of the incident light is, the value of the refractive index n2 of the liquid crystal layer is controlled to be closer to $(\lambda/2+m\lambda)/(2d)$. It should be noted that, when light is not strong, a certain degree of reflection on buildings is no longer pollution but has a positive effect. Thus, it is not always necessary to control n2 to take the ideal value, and it is necessary to reasonably set reflectivity and adjust N2 value according to light intensity. In theory, the overall reflectivity of the reflectivity adjustable wall module is adjusted in a range from a to (a−b*c), where a represents the reflectivity of the transflective layer, b represents a transmittance of the transflective layer, and c represents the reflectivity of the electrochromic reflective layer.

Sunlight is actually composed of light waves with different frequencies and is not monochromatic light, thus, in actual applications, light with a wavelength λ of 550 nm is selected to calculate the ideal value of the refractive index n2 since the human eye is most sensitive to light with the wavelength of 550 nm.

In some embodiments, each wall unit has its own light sensing unit and component control unit. In other embodiments, when an area of each wall unit is designed to be smaller, each reflectivity adjustable wall module may include multiple reflectivity adjustable wall units and these reflectivity adjustable wall units are adjacent to each other. Since the area of each wall unit is smaller and the difference in light intensity radiated to multiple adjacent wall units is not obvious, it is not necessary to individually set one light intensity sensor for each unit, and several units may share one light sensing unit and one component control unit.

The component control unit 300 of the present disclosure may be a computing device, which includes a memory and a processor. The memory stores executable instructions that can be executable on the processor. When the processor executes the executable instructions, the controlling method of the above embodiment can be implemented. The computing device may include but not limited to, a single chip microcomputer, a programmable logic controller (PLC), a complex programmable logic device (CPLD), a programmable gate array (PGA) and a field programmable gate array (FPGA).

In some embodiments, the reflectivity adjustable wall module of the present disclosure may be used not only for anti-glare when the light is strong, but also used for increasing road lighting when the light is weak, or used for providing lighting via reflection for other buildings located at a special angle of the building where the reflectivity adjustable wall module is disposed. At this point, the ideal refractive index n2 of the liquid crystal layer is selected to be closer to (mλ)/(2d), thereby superimposing the first reflection component and the second reflection component to enhance light intensity. For urban dense high-rise buildings, mutual occlusion between buildings is very serious, proper reflection occurring at suitable time at exterior walls of buildings at proper positions may introduce natural light into obscured buildings, thereby realizing real intellectualization of buildings.

In some embodiments, the light sensing unit can not only measure light intensity of incident light to the reflectivity adjustable wall unit, but also measure wavelength and frequency of the light. Particularly, when the frequency of the incident light is concentrated in a narrow frequency band or even monochromatic light, the component control unit controls the electrochromic reflective layer to enter into the mirror reflection state when the light intensity is greater than the specified threshold, according to the light intensity of the incident light obtained by the light sensing unit via measurement; and, the component control unit controls the refractive index n2 of the liquid crystal layer to take the ideal value, according to the wavelength of the incident light, thereby enabling the first reflection component and the second reflection component of the incident light to cancel each other out in a predetermined ratio. In the extreme case, the first reflection component and the second reflection component can completely cancel out, thereby showing a "0 reflection" state. Such a situation may correspond to other application scenes rather than the application scene of using as the external wall, for example, using as a chamber wall of some optical devices for destructive interference of a monochromatic light. When the reflectivity adjustable wall module of the present disclosure is used as a shell of a building or an object, adaptive zero reflection may be achieved for monochromatic incident light by means of complete destructive interference, thereby enabling the building or the object to be "invisible" under lidar.

When several reflectivity adjustable wall modules 10 construct an exterior wall of a building, several reflectivity adjustable wall modules 10 are adjacent to each other to form a whole. Each wall module independently adjusts its reflectivity according to its own light intensity, and dynamically adjusts the overall reflectivity by controlling an optical path difference between the first reflection component and the second reflection component via adjusting the refractive index of the liquid crystal layer, thereby achieving real-time control effect, effectively preventing dazzling reflections, reducing light pollution, protecting visual organs of motorists and aircraft pilots from injury and ensuring traffic safety. For users in the building, two destructive interference of reflected light may reduce incidence of strong light into the building while reducing heat adsorbed by a building façade, thereby facilitating energy saving for buildings in summer. This will not only protect the environment and public interests, but also benefits the users of buildings. The benefit to the actual user of the building is a priority in building construction, by adopting the present disclosure, not only aesthetics of the traditional glass exterior wall may be obtained, but also the interests of the users in the building and the public interest are no longer contradictory, so that the builders are more motivated to adopt an external wall scheme that is beneficial to the environment and the public interest.

Figure 7:
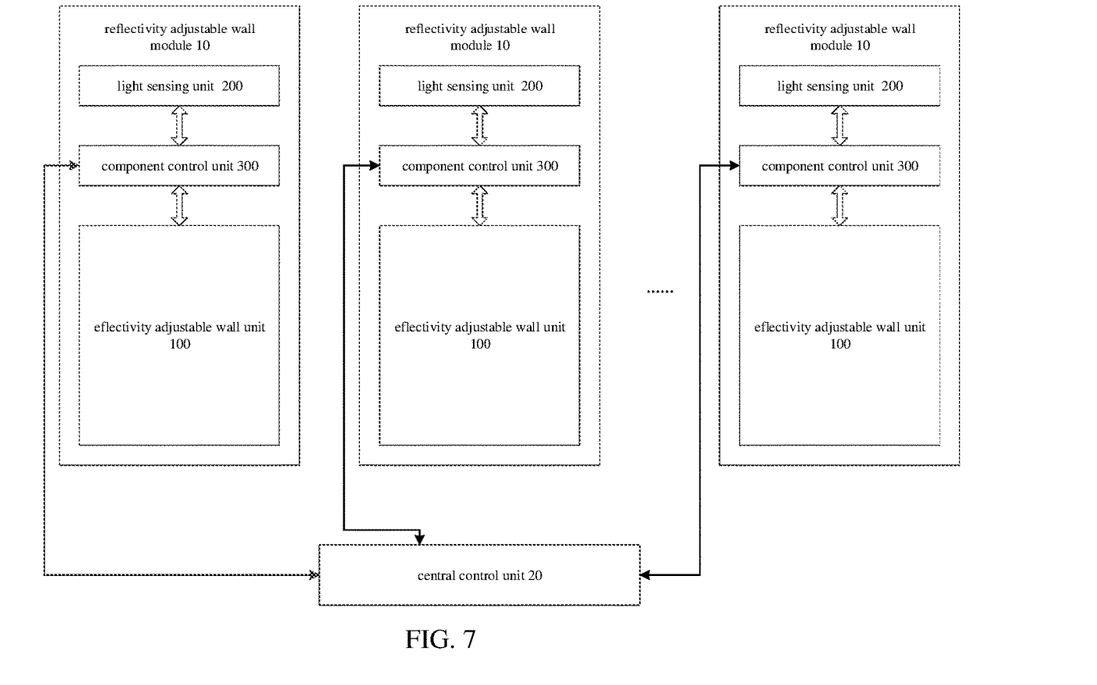
FIG. 7 is a block diagram of an intelligent building exterior wall system according to an embodiment of the present disclosure.

FIG. 7 is a block diagram of an intelligent building exterior wall system according to an embodiment of the present disclosure. In some embodiments, the intelligent building exterior wall system may be designed to include a central control unit. Referring to FIG. 7, the central control unit 20 is communicated with each component control unit 300 and controls each component control unit 300 to work. The central control unit may be a separate computer host, or may be integrated with a central control system of the intelligent building and may be implemented as a program function module. The distributed control architecture of the central control unit and the component control unit may provide a complete control mode, which may uniformly schedule individual wall modules, monitor states of individual wall modules to find faults in time, and coordinate with controls of other parts of the intelligent building. The reflectivity adjustable wall module may adopt implementation of any one of the above embodiment, which is not elaborated herein.

In the present disclosure, the terms "outer", "inner", "outer layer" and "inner layer" are merely used to conveniently illustrate relative orientations of each other, and are not used to limit structures and usage modes of products of the present disclosure. In many cases, the products of the present disclosure may be in form of a plane or a plane-like form. The outer layer and the inner layer merely represent two different sides of the product. For example, when using as an exterior wall or window of a building, the transflective layer that is used as an outer layer, may be oriented towards outdoors; and the reflective layer that is used as an inner layer, may be oriented towards indoors. When using for other purposes, the transflective layer that is used as the outer layer, may be oriented towards indoors; and the reflective layer that is used as the inner layer, may be oriented towards outdoors.

The embodiments of the present disclosure have been described hereinbefore using block diagrams, flow charts and/or examples. It should be appreciated that, in the case that the block diagrams, flow charts and/or examples include one or more functions and/or operations, each function and/or operation included in the block diagrams, flow charts and/or examples may be implemented individually, or collectively, through hardware, software, firmware or essentially the combinations thereof. In one embodiment, several parts of the subject matter of the present disclosure may be implemented by an application specific integrated circuit (ASIC), a field programmable gate array (FPGA), a digital signal processor (DSP) or any other integration formats.

Any module or unit in the embodiments of the present disclosure may be implemented mechanically or electronically. For example, one module may include a permanent circuit or a logic element for a specific operation. The module may also include a programmable logic element or circuit (e.g., a general-purpose processor or any other programmable processors) configured temporarily by the software, so as to perform the specific operation. However, it should also be appreciated that, some aspects of the embodiments of the present disclosure may be, completely or partially, implemented equivalently in an integrated circuit as one or more programs capable of being run on one or more computers (e.g., computer systems), one or more programs capable of being run on one or more processors (e.g., microprocessors), firmware, or essentially combinations thereof. According to the present disclosure, a person skilled in the art has the capability of designing the circuits and/or writing software and/or firmware codes. In addition, it should further be appreciated that, mechanisms of the subject matter of the present disclosure may be dispersed as program products in various forms, and regardless of the types of a signal-carrying medium actually used for the dispersion, the signal-carrying medium may be applicable to the illustrative embodiments of the subject matter of the present disclosure. Examples of the signal-carrying medium include, but not limited to, a recording-type medium such as a soft disc, a hard disc drive, a compact disc (CD), a digital versatile disc (DVD), a digital tape and a computer memory; and a transmission-type medium such as a digital and/or analogue communication medium (e.g., an optical fiber/cable, a waveguide tube, a wired communication link and a wireless communication link).

Unless otherwise defined, any technical or scientific terms used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than being limited to physical or mechanical connection. Such words as "on/above", "under/below", "left" and "right" are merely used to represent relative position relationship, and when an absolute position of an object is changed, the relative position relationship will be changed too.

The above are merely the preferred embodiments of the present disclosure and shall not be used to limit the scope of the present disclosure. It should be noted that, a person skilled in the art may make improvements and modifications without departing from the principle of the present disclosure, and these improvements and modifications shall also fall within the scope of the present disclosure.

What is claimed is:

1. A reflectivity adjustable wall module comprising:
   a reflectivity adjustable wall unit comprising:
      a transflective layer;
      a reflective layer;
      a first sealing gap defined between the transflective layer and the reflective layer; and
      a liquid crystal layer in the first sealing gap;
      wherein the transflective layer is used as an outer layer of the reflectivity adjustable wall unit, reflects some of ambient light irradiated at the transflective layer and allows the rest of the ambient light to pass through;
      wherein the reflective layer and the transflective layer are opposite to each other; the reflective layer includes an electrochromic reflective layer, a liquid crystal electrode layer and a base substrate; the electrochromic reflective layer, the liquid crystal electrode layer and the base substrate are sequentially arranged from an outside to an inside; and
      wherein the electrochromic reflective layer has variable reflectivity under control of an external control voltage; and the liquid crystal layer has variable refractive index under control of the liquid crystal electrode layer;
   a light sensing unit configured to measure light intensity of light incident to the reflectivity adjustable wall unit; and
   a component control unit communicated with the light sensing unit and electrically connected with the reflectivity adjustable wall unit;
   wherein the component control unit is configured to, according to the light intensity of the incident light obtained by the light sensing unit via measurement, control the reflectivity of the electrochromic reflective layer by controlling the electrochromic reflective layer to enter into a mirror reflection state when the light intensity is greater than a specified threshold, and control the refractive index of the liquid crystal layer in the reflectivity adjustable wall unit, thereby enabling a first reflection component and a second reflection component of the incident light to cancel each other out in a predetermined ratio; and
   wherein the first reflection component refers to one part of the incident light, that is directly reflected at an outer surface of the transflective layer; the second reflection component refers to another part of the incident light, that is refracted by the transflective layer and the liquid crystal layer and then reflected by the reflective layer, then refracted by the transflective layer and the liquid crystal layer again and emits from the transflective layer.

2. The reflectivity adjustable wall module of claim 1, wherein the predetermined ratio according to which the first reflection component and the second reflection component cancel each other out, are set to be that the stronger the light intensity of the incident light is, the greater the predetermined ratio according to which the first reflection component and the second reflection component cancel each other out.

3. The reflectivity adjustable wall module of claim 1, wherein the refractive index of the liquid crystal layer satisfies $n_2=(\lambda/2+m\lambda)/(2d)$, where $\lambda$ represents wavelength of light, m is an integer, d represents a width of the first sealing gap between the transflective layer and the reflective layer, a maximum destructive interference is achieved between the first reflection component corresponding to the wavelength $\lambda$ and the second reflection component corresponding to the wavelength $\lambda$; the stronger the light intensity of the incident light is, a value of the refractive index of the liquid crystal layer is controlled to be closer to $(\lambda/2+m\lambda)/(2d)$.

4. The reflectivity adjustable wall module of claim 1, wherein
the light sensing unit is further configured to measure wavelength of the incident light to the reflectivity adjustable wall unit;
the component control unit is configured to, according to the wavelength of the incident light, control the refractive index of the liquid crystal layer, thereby enabling the first reflection component and the second reflection component of the incident light to cancel each other out in a predetermined ratio.

5. The reflectivity adjustable wall module of claim 1, wherein there is a plurality of reflectivity adjustable wall units that are adjacent each other.

6. An intelligent building exterior wall system comprising a plurality of the reflectivity adjustable wall modules of claim 1.

7. The intelligent building exterior wall system of claim 6, further comprising a central control unit; wherein the central control unit is communicated with each component control unit and controls each component control unit to work.

8. The intelligent building exterior wall system of claim 7, wherein there is a plurality of reflectivity adjustable wall units in each reflectivity adjustable wall module, and the reflectivity adjustable wall units are adjacent each other.

9. The reflectivity adjustable wall module of claim 1, wherein the electrochromic reflective layer employs an electro-reflection mechanism based on silver ion gel electrolyte deposition, and the electrochromic reflective layer includes:

a smooth transparent electrode layer with a smooth electrode surface for deposition of silver ions for forming mirror reflection;
a rough electrode layer with a rough electrode surface for deposition of silver ions for forming low reflection;
a second sealing gap defined between the smooth transparent electrode layer and the rough electrode layer; and
gel electrolyte containing silver ions in the second sealing gap.

10. The reflectivity adjustable wall module of claim 1, wherein the electrochromic reflective layer employs hydrogen ion implantation type electrochromic reflective material based on Mg—Ni alloy.

11. The reflectivity adjustable wall module of claim 1, wherein the refractive index of the liquid crystal layer is adjustable in a range of from 1.4 to 1.6.

12. The reflectivity adjustable wall module of claim 1, wherein the transflective layer is made of material that has a reflectivity in a range of from 40% to 70%, a transmittance in a range of from 30% to 60%, and a refractive index in a range of from 1 to 1.7.

13. The reflectivity adjustable wall module of claim 1, wherein the transflective layer includes a glass substrate and a brightening film; and the brightening film is attached to the glass substrate with a mirror surface of the brightening film oriented towards the outside.

14. The reflectivity adjustable wall module of claim 1, wherein the transflective layer and the reflective layer are sealed together by a sealing device with the first sealing gap defined between the transflective layer and the reflective layer.

15. The reflectivity adjustable wall module of claim 9, wherein the smooth transparent electrode layer and the rough electrode layer are sealed by a sealing device with the second sealing gap defined between the smooth transparent electrode layer and the rough electrode layer.

* * * * *

UNITED STATES PATENT AND TRADEMARK OFFICE
CERTIFICATE OF CORRECTION

PATENT NO. : 10,598,984 B2
APPLICATION NO. : 16/140047
DATED : March 24, 2020
INVENTOR(S) : Bo Shi Page 1 of 1

It is certified that error appears in the above-identified patent and that said Letters Patent is hereby corrected as shown below:

On the Title Page

Item (73), In the Assignees section:
Delete "BOE TECHNOLGOY GROUP CO., LTD."
Insert --BOE TECHNOLOGY GROUP CO., LTD.--

Signed and Sealed this
Eighteenth Day of August, 2020

Andrei Iancu
*Director of the United States Patent and Trademark Office*